3,264,126
PIGMENTED PAPER COATINGS CONTAINING PROTEIN AND A DI(LOWER ALKOXYMETHYL) URON
Daniel Dickerson Ritson, Riverside, Conn., assignor to American Cyanamid Company, Stamford, Conn., a corporation of Maine
No Drawing. Filed June 24, 1963, Ser. No. 290,217
6 Claims. (Cl. 106—146)

The present invention relates to a pigmented aqueous paper-coating composition containing a water-soluble protein as adhesive for the pigment and a latent insolubilizing agent for the protein.

Water-soluble proteins are used in the manufacture of coated paper in conjunction with paper-coating pigments (clay, titanium dioxide, calcium carbonate, etc.) to impart to paper an opaque coating which improves its printing properties. The paper is coated with a suspension of a pigment (e.g. clay) in an aqueous medium which contains a water-soluble protein as binder or adhesive for the pigment, and an opaque coating develops when the suspension dries. A disadvantage is that the water-soluble protein remain water-dispersible after drying, so that the pigment is easily rubbed off when the coating is moistened. The resulting paper possesses unsatisfactory "wet-rub" resistance and cannot be used in the presence of moisture.

The present invention lies in the discovery that di(lower alkoxymethyl)urons having the formula

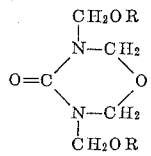

(wherein the R's represent the same or different lower alkyl radicals) act as rapid and effective insolubilizing agent for these proteins.

I have found that fluid aqueous coating compositions comprising a paper-coating pigment, a water-soluble protein adhesive therefor and one or more than one of the above-described urons yield opaque coatings which possess very satisfactory wet-rub resistance when the compositions are applied to a fibrous cellulose substrate (for example, paper) and the substrate is dried at temperatures and for times which are customary in the paper-coating industry.

A feature of these compositions is that even when containing comparatively large amounts of the uron their viscosity remains about the same as if none of the uron were present.

The di(lower alkoxymethyl)urons are known to the chemical art and are made by condensing urea with formaldehyde to form di(hydroxymethyl)uron, and then reacting this uron with one or more of the lower alkanols to form the lower alkoxymethyl derivatives. Methanol, ethanol and isopropanol are suitable lower alkanols.

The compositions of the present invention are conveniently prepared in two steps. In the first step, a small amount of the di(lower alkoxymethyl)uron is added to an aqueous solution of a protein adhesive having an alkaline pH. The uron dissolves readily in the solution. In the second step a clay or other pigment slurry is added to the solution in desired amount. The amount of water is varied to provide a convenient viscosity, and other materials such as fluidizers, mold-growth inhibitors, and antifoam agents may be present.

If preferred, the clay slurry and the protein solution can be mixed in the first step, and addition of the uron can be postponed until just before the composition is to be applied to the cellulose web.

The precise amount of the uron which need be present in the coating composition in any instance depends chiefly upon the amount of wet-rub resistance which it is desired that the composition should possess when applied to paper, paperboard, etc., and this in turn generally depends upon the expected use of the product. It is consequently most easily determined by laboratory trial. About 5%, based on the weight of the protein, is about the least that causes a generally useful degree of insolubilization, and we have found that about 12.5% on the same basis is about the most that can be effectively or economically used, larger amounts causing only slightly greater improvements in wet-rub resistance.

In the laboratory between about 7.5% and 10% of the uron based on the weight of the protein has generally proved sufficient to cause the coating to have satisfactory wet-rub resistance, and this is therefore regarded as the practical range.

The compositions of the present invention may be employed as coatings for paper, paperboard, plaster, etc. Wet-rub resistance develops slowly on drying and storage at room temperature but develops in 2–5 minutes when the coating is heated in the range of 250°–300° F. The uron reacts with the protein and insolubilizes it by a cross-linking reaction.

The invention will be more particularly illustrated by the examples which follow, which constitute specific embodiments of the invention and are not to be construed as limitations thereon.

Example 1

The following illustrates the preparation, according to the present invention, of aqueous proteinaceous paper coating compositions containing a di(lower alkoxymethyl)uron as latent insolubilizing agent for the protein.

Into 615 g. of water containing 15 g. of 26 Bé ammonium hydroxide is stirred 126 g. of 90% casein (113.4 g. dry basis). After 30 minutes, the mixture is heated with stirring to 55° C. and is maintained at that temperature for 20 minutes with continued stirring until the casein is completely dissolved. The dispersion is then cooled to 100° F., and the water lost by evaporation is replaced. The solution has a pH of 9.1 and contains 15% of casein by weight.

To 333 g. of the above is added with stirring first 82 cc. of water and then a slurry of 503 g. of paper coating clay in 232 cc. of water containing 2 g. of tetrasodium pyrophosphate. The resulting coating composition contains 10% of casein based on the clay, 48% total solids by weight, and 43.3% clay by weight.

Five 100-g. aliquots are removed from the resulting slurry. To four of these are respectively added with stirring sufficient quantities of the uron to supply the amounts thereof shown in the table below. One aliquot is reserved as control, and to this nothing is added.

The coating compositions containing the uron do not change in viscosity when maintained at room temperature for 24 hours.

The foregoing compositions are applied at a weight of 15 lbs. per 25" x 38"/500 ream to coating raw stock sheets by use of a 0.0005" knife applicator. The sheets are dried at room temperature and oven-cured at 300° F. for the times shown in the table below and then calendered.

The sheets are tested for their wet-rub resistance by a standard laboratory method wherein the test sheet after being conditioned at 50% relative humidity and at room temperature is placed on a black sheet and rubbed three times with a thumb moistened with a 0.02% solution of NaOH in water, so as to transfer the coating to the underlying black sheet. The results are reported on a scale of 10 in which 0 designates rapid and extensive removal of the coating, 10 designates no removal of the coating, and intermediate values designate proportional amounts removed. A value of 7 is considered commercially acceptable.

Results are as follows:

| Run No. | Di(methoxy-methyl) Uron, Percent [1] | Temp., °F. | Time, Min. | Wet Rub Test [2] | Viscosity, Poises |
|---|---|---|---|---|---|
| 1 | None | 300 | 4 | 0 | 2,200 |
| 2 | 5.0 | 300 | 4 | 7 | |
| 3 | 7.5 | 300 | 4 | 8 | 2,300 |
| 4 | 10 | 300 | 4 | 9 | 2,300 |
| 5 | 12.5 | 300 | 4 | 9½ | 2,500 |
| 6 | 7.5 | 300 | 1 | 5 | |
| 7 | 7.5 | 300 | 2 | 7 | |
| 8 | 7.5 | 300 | 3 | 7+ | |

[1] Based on weight of the protein.
[2] See text above.

*Example 2*

The procedure for Run No. 4 of Example 1 is repeated except that the pigment is calcium carbonate and the adhesive is soya protein. Results are substantially the same.

I claim:

1. A fluid aqueous paper coating composition consisting essentially of a pigment, a water-soluble protein adhesive for said pigment, and a di(lower alkoxymethyl)uron as latent insolubilizing agent for said protein.

2. A composition according to claim 1 wherein the pigment is clay.

3. A composition according to claim 1 wherein the pigment is calcium carbonate.

4. A composition according to claim 1 wherein the adhesive is casein.

5. A composition according to claim 1 wherein the adhesive is soya protein.

6. A fluid aqueous paper coating composition consisting essentially of a pigment, a water-soluble protein adhesive for said pigment, and a di(methoxymethyl)uron as latent insolubilizing agent for said protein.

References Cited by the Examiner

UNITED STATES PATENTS

| | | | |
|---|---|---|---|
| 2,719,146 | 9/1955 | Schwander | 260—119 |
| 3,021,321 | 2/1962 | Young | 260—117 |
| 3,136,652 | 6/1964 | Bicknell | 117—156 |

ALEXANDER H. BRODMERKEL, *Primary Examiner.*

D. J. ARNOLD, *Assistant Examiner.*